April 20, 1954  C. L. CRADDOCK  2,675,827
AUXILIARY BRAKE VALVE WITH VEHICLE STOP LIGHT CIRCUIT BREAKER
Filed Dec. 12, 1949
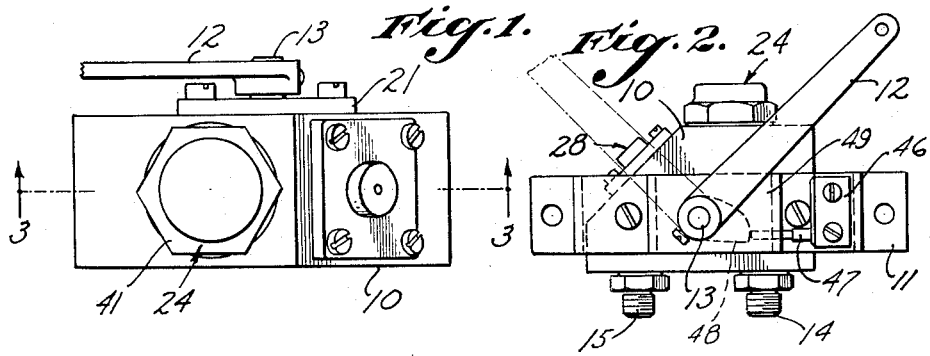
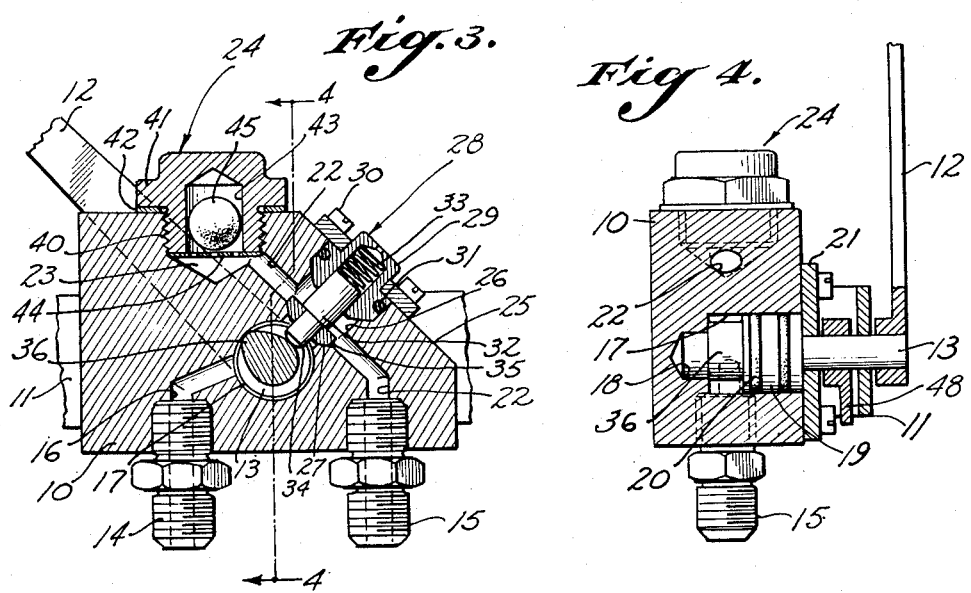
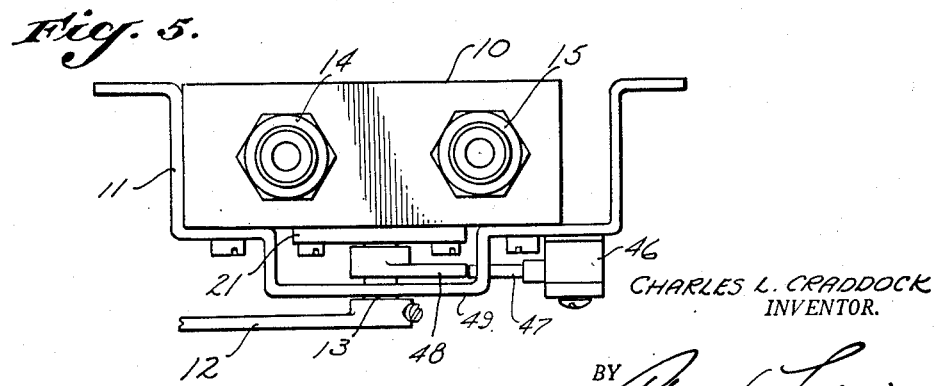
CHARLES L. CRADDOCK
INVENTOR.
BY
ATTORNEY.

Patented Apr. 20, 1954

2,675,827

UNITED STATES PATENT OFFICE 2,675,827

AUXILIARY BRAKE VALVE WITH VEHICLE STOP LIGHT CIRCUIT BREAKER

Charles L. Craddock, North Hollywood, Calif., assignor of one-half to Fred Schunk, North Hollywood, Calif.

Application December 12, 1949, Serial No. 132,491

4 Claims. (Cl. 137—560)

My invention relates generally to fluid-operated braking systems, and more particularly, to an auxiliary brake valve for use on such systems.

Fluid braking systems are customarily used on motor vehicles as a primary means for braking, and are supplemented by a separate parking or emergency brake, mechanically linked to the brake shoes of the primary brake system. The parking brakes are usually quite ineffective, and have certain inherent defects which cannot be corrected.

Normally, the parking brakes are connected to the brake shoes of the rear wheels of the vehicle, and are not connected to front wheels because of the complex linkage needed. Since inly one-half of the total braking area is utilized, and because the linkage has a low mechanical advantage, very little force can be applied. After the shoes and linkage have become slightly worn, even relatively new vehicles cannot be safely parked on even a slight incline. The foregoing condition is especially dangerous in vehicles having fluid transmissions and couplings, for in such vehicles, the compression of the engine cannot be utilized as a braking means. Consequently, in view of the present trend of automotive design, the need for adequate parking brakes will become more critical.

A conventional parking brake is regarded as an emergency brake because of its direct mechanical linkage, and for psychological reasons, if no other, its provision on conventional vehicles will be continued. It is therefore an object of my invention to provide an accessory to the vehicle for use in parking which is an addition to the conventional primary and parking brakes of the vehicle, and in no way destroys their efficiency.

By using an auxiliary valve means in the primary braking system, it is possible to lock the pressure within the individual servo mechanisms and hold the brake shoes in engagement with the drums. This provides an easily operated parking brake using the full pressure of the primary system. Prior devices have recognized this principle, and some complex valve means have been partially successful. However, the defective operation of such a valve may destroy the safety of the primary braking system and it is imperative that this should not happen. A particular consideration in an auxiliary brake valve is the provision of means to allow expansion and contraction of the braking fluid while maintaining the pressure in the system. If this is not done, the fluid lines may rupture or the brakes may be inadvertently released. In order to overcome these results, I have provided a new and unique variable displacement means which makes the operation of the valve much more reliable than has heretofore been possible.

Accordingly, it is a major object of my invention to provide an improved auxiliary brake valve adapted to be connected to the primary braking system in order that this system may operate as a parking brake.

It is another object of my invention to provide an auxiliary brake valve which may be installed on any conventional braking system at a nominal cost.

A further object of my invention is to provide an auxiliary brake valve which properly compensates for the thermal expansion and contraction of the fluid within the braking system without destroying the integrity of the system.

Still another object of my invention is to provide an auxiliary brake valve that can be economically manufactured, while being ruggedly and simply constructed.

These and other objects and advantages of my invention will become apparent from the following detailed description of a preferred form thereof, and from an inspection of the accompanying drawings, in which:

Figure 1 is a top plan view of my improved auxiliary brake valve;

Figure 2 is a side elevation of the device shown installed on an automobile frame;

Figure 3 is a vertical longitudinal cross-section of the device;

Figure 4 is a cross-section of the device taken along the line 4—4 of Figure 3; and Figure 5 is a bottom plan view of the device showing the mounting bracket thereon.

The conventional fluid braking systems now used in vehicles are well known in the art, and in and of themselves form no part of my invention. It is therefore not deemed necessary to illustrate and describe such a system in detail. However, for the purposes of this application, a braking system may be considered as comprising a master cylinder actuated by a spring-returned pedal, and a plurality of servo mechanisms connected to the individual brake shoes at each wheel of the vehicle. The master cylinder and the servo mechanisms are hydraulically connected, and pressure created in the master cylinder is transmitted to the servos to actuate the brake shoes. Because a spring-returned actuating pedal is used, the pressure in the master cylinder is released when the driver's foot is removed from the pedal, and consequently, the brakes cannot be set when the vehicle is unoccupied. By placing my auxiliary brake valve into the system between the master cylinder and the servo mechanisms, return of the fluid from the servo mechanisms to the master is prevented. Hence, pressure can be maintained in the servo mechanisms to hold the brakes when the vehicle is unoccupied.

Referring now to the drawings, and particularly to Figures 1 and 2 thereof, the numeral 10 indicates a generally rectangular valve body or block that is preferably held in a horizontal position by a mounting bracket 11, adapted to be secured to a suitable frame member of the vehicle on which the device is installed. On the side of the body 10 is an operating lever 12 which is fixed on the end of a horizontal shaft 13 journaled within the body. The upper end of the lever 12 is adapted to be connected by a linkage (not shown) to the hand grip of the conventional parking brake or to other convenient means for selectively moving the lever forwardly and backwardly a limited amount, thereby rotating the shaft 13 within the body 10. This action opens and closes valving means, as will hereinafter be explained.

Secured in the bottom of the body 10 are a pair of couplings, such as the threaded tubular fittings 14 and 15. The outer end of the intake fitting 14 is adapted to be connected to a hydraulic line (not shown), leading to the master cylinder of the brake system, and the discharge fitting 15 is adapted to be similarly connected to a line (not shown) leading to the servo mechanisms. When pressure is created in the master cylinder, the fluid must pass through the valve body 10 in order to energize the servo mechanisms, and conversely, it must return through the valve body to de-energize the brakes.

A passageway 16 in the body 10 leads upwardly and inwardly from the fitting 14 to a central cylindrical chamber 17 which extends horizontally into the side of body 10, and surrounds the shaft 13. The chamber 17 is larger than the inner portion of the shaft 13 and forms an annular space therearound, as is best seen in Figure 4. At its inner end, the chamber 17 is reduced to form a journal 18 supporting the shaft 13, and the outer end of the chamber is closed by an enlarged hub or boss 19 on the shaft. Sealing means such as spaced O-rings 20 are provided on the hub 19 so as to prevent any leakage from the chamber, and a flange 21 is fastened to the side of the body to hold the shaft 13 free from axial movement. The outer portion of the shaft 13 passes through the mounting bracket 11, and has the lever 12 fixed on its extreme outer end. As can be understood, the shaft 13 is positively held in position, and the pair of O-rings 20 provides a high pressure seal for the chamber 17.

Leading upwardly and inwardly from the discharge fitting 15 is a passageway 22, spaced above the chamber 17, and terminating in the bottom of a chamber or seat 23 formed in the top of the body 10. The chamber 23 may be designated as a pressure control chamber, and is closed by a cap 24, which is threaded or otherwise firmly held to the top of the body 10. Adjacent and parallel to the passageway 22, the body 10 has an angular end wall 25, and a cylindrical valve chamber 26 extends downwardly, perpendicular to the wall, to terminate in the chamber 17. The valve chamber 26 and the passageway 22 are laterally aligned to intersect so that the valve chamber connects with the chamber 17. Thus, as can be seen, there is a fluid path from the inlet fitting 14 to the outlet fitting 15 through the passageway 16, the chamber 17, the valve chamber 26, and the passageway 22.

The lower end of the valve chamber 26 adjacent the chamber 17 is reduced to form a valve seat 27, and a check valve 28 cooperates with the valve seat to prevent any flow of fluid between the chamber 17 and the passageway 22.

The upper end of the valve chamber 26 is closed by a flanged cap 29 which overhangs the chamber and is fastened to the wall 25 by means such as the bolts 30. The lower portion of the cap 29 fits within the chamber 26 and carries sealing means such as the O-rings 31 to bear against the chamber walls and prevent any leakage of the brake fluid. A valve stem 32 is slidably held within the cap 29 and is urged downwardly by a helical spring 33 confined between the cap and the stem. Above the valve seat 27, a valve head or disc 35 is affixed to the stem 32, and is adapted to close downwardly against the seat when the stem is in the downwardly urged position, as shown in Figure 3. At its lower end, the stem 32 is reduced to form a plunger or follower 34 which extends into the chamber 17 and rides on the side of the shaft 13, being selectively raised or lowered by an eccentric or cam 36 extending from the side of the shaft. When the shaft 13 is rotated, as shown in Figure 3, the cam 36 allows the follower 34 to drop down and the disc 35 closes against the seat 27.

Under normal conditions of operation, the lever 12 is in its forward position, as shown in phantom line in Figure 2, and the shaft 13 is rotated to the position in which the follower 34 is held upwardly by the cam 36 on the side of the shaft. In this position, the valve disc 35 is spaced above the seat 27 and offers no resistance to fluid flow between the chamber 17 and the passageway 22. As may be understood, the lever 12 is forward when the vehicle is being driven by its owner, and the auxiliary valve means has no effect upon the operation of the primary braking system, since there is a free path for fluid flow between the fittings 14 and 15 through the body 10.

When the vehicle is stopped after the normal use of the primary braking system, the parking brake is applied, thereby moving the lever 12 rearwardly to the position shown in Figures 2 and 3. The cam 36 is thus rotated to the position shown in Figure 3, permitting the valve disc 35, under the urging of the spring 33, to bear against the valve seat 27 and close the valve. If the pressure within the passageway 22 increases, the valve disc 35 is closed more firmly against the seat 27 and none of the fluid can pass it to enter the chamber 17. On the other hand, a fluid pressure increase within the chamber 17 will lift the valve disc 35 sufficiently to allow fluid to pass into the valve chamber 26 and passageway 22.

Assuming that the vehicle is stopped, and the lever 12 has been moved rearwardly by the application of the parking brake to close the valve 28, the driver then applies pressure to the braking system through his foot pedal. Fluid in the chamber 17 lifts the valve disc 35 from its seat and enters the passageway 22 to travel to the servo mechanisms of the wheel brakes. The pressures on each side of the valve equalize immediately, and the valve disc 35 is again urged against the seat 27 by the spring 33, while the servo mechanisms are left under full braking pressure. The valve 35 prevents any return of fluid from the servo mechanisms, and the vehicle is firmly held in position. The force applied at the brake shoes may be as great as desired, depending upon the parking conditions under which the vehicle is left. It may also be understood that, should the device be only lightly set, and the vehicle be inadvertently driven away, the primary braking system is still available for use since the valve disc 35 will lift at any time upon the application of pressure to the system.

When the vehicle is thus left unoccupied with pressure applied in the fluid system, it is necessary to provide for expansion and contraction of the fluid therein, as caused by changing external temperatures. If the vehicle is parked during the cool period of the day and the ambient temperature gradually rises, the thermal expansion of the brake fluid will increase the pressure on the system and may rupture the fluid lines. Likewise, if the temperature decreases, the pressure may decrease sufficiently to release the vehicle. I have provided for both expansion and contraction of the fluid by means within the previously mentioned pressure control chamber 23.

The cap 24, closing the chamber 23, engages the body 10 as by the threads 40 and has an upper flange 41 which overhangs the body 10 and seals firmly therewith by means of an annular gasket 42. As can best be seen in Figure 1, the flange 41 is preferably formed with a polygonal shape and may be tightened downwardly against the gasket 42 by a large wrench so as to positively prevent any leakage from the body 10. However, should it be necessary to remove the cap 24, it may be easily and rapidly done. The lower end of the cap 24 is counterbored to provide a cylindrical chamber 43 partially closed along the bottom by means of a grating or screen 44 extending thereacross. The diameter and length of the chamber 43 are restricted sufficiently so as to leave a rigid wall of material separating the chamber 23 from the outside, and as can be understood, corrosion, dirt and grease will not affect the chamber, nor will variations in external pressure.

Confined within the chamber 43 is a variable displacement means such as a hollow body 45 formed as a sphere or other suitable shape. The body 45 is preferably made of neoprene which resists the destructive action of hydraulic brake fluid, and retains its resilience for an extended time. The walls of the body 45 are collapsible, and the body is inflated to a pressure considerably less than that of the full braking pressure of the system. Thus, when the pressure is applied to the braking system, the body 45 is partially collapsed, and its displacement is proportionally reduced.

Thereafter, if the brake fluid within the system expands due to a temperature increase, the body 45 is collapsed further and there is no excessive strain placed on the hydraulic lines or other elements of the system, which might rupture and allow the fluid to discharge. As can also be understood, the change in displacement of the body 45 is not affected by variations in ambient pressure outside of the body 10, and the rigid walls of the chamber 43 protect the system should the wall of the body 45 part under fatigue or extreme pressure.

If, after the braking device is set, the external temperature decreases and the braking fluid contracts, the body 45 will tend to return to its normal shape and will increase its displacement proportionally. Because of the increased displacement of the body 45, the pressure will remain on the servo mechanisms and prevent the release of the vehicle. Otherwise, the vehicle might be inadvertently released during a normal nightly temperature drop or the like.

The feature of a variable displacement means which adequately compensates for temperature changes without sacrificing the integrity of the system is of extreme importance in such an auxiliary brake device, and its omission has been one of the great disadvantages of prior devices. Any flexible element such as the collapsible body described herein is subject to parting from extreme pressure or fatigue. As can now be fully understood, this danger to the integrity of the system is overcome in my device by the use of the variable displacement means within the rigid walls of the expansion chamber. Should the body of the displacement means fail, only a slight additional fluid displacement will result, as is well within the operating capacity of the conventional braking system.

On the outside of the valve body 10, as may best be seen in Figure 5, the mounting bracket 11 has a U-shaped central section 49 which is spaced outwardly from the body and journals the shaft 13. A switch 46 is mounted on the bracket 11 outwardly of the center section 49 and has an actuating plunger 47 extending inwardly towards the shaft 13. The shaft 13 carries an external cam member 48 which rides against the plunger 47 and moves the latter outwardly when the operating lever 12 is moved to the parking position, as shown in Figure 5. Outward movement of the plunger 47 causes the switch 46 to open and break a circuit (not shown) leading to the stop lights of the vehicle. This is necessary to prevent the stop lights from remaining on when the vehicle is parked, since it is conventional to actuate the stop lights by a hydraulically operated switch, and such switch will be energized with the fluid pressure locked in the braking system.

From the foregoing, it can be seen that I have provided a supplemental brake valve which is easily installed on a conventional vehicle and in no way impairs the efficiency of the usual braking systems. Likewise, it can be seen that the device is simply constructed and ruggedly built to give long, trouble-free service. I wish it to be understood, however, that there are many modifications of design and construction that will be apparent to those skilled in the art, and I do not wish to be restricted to the details of design and construction shown and described herein, except as defined by the appended claims.

I claim:

1. In an auxiliary braking device, the combination which includes: a housing adapted to be connected into the main line of a vehicle fluid braking system and having intake and discharge passageways therein connected through a valve chamber; a spring-urged check valve normally closing within said valve chamber and opened by a pressure increase within said intake passageway; a pressure control chamber wihin said housing communicating with said discharge passageway; resilient variable displacement means within said pressure control chamber, said means changing displacement in response to the thermal expansion and contraction of the brake fluid whereby to maintain a substantially constant pressure in said discharge passageway when said valve is closed; electrical switching means mounted on the outside of said housing and opened by the movement of a plunger extending therefrom; a rotatable operating shaft extending into said housing; cam means on the inner portion of said shaft operable to lift and hold said valve open; and cam means mounted on the outer end of said shaft and operable to move said plunger to open said switch when said valve is closed.

2. In an auxiliary braking device, the combination which includes: a housing adapted to be connected into the main line of a vehicle fluid braking system and having intake and discharge passageways therein connected through a valve chamber; a spring-urged check valve normally closing within said valve chamber and opened by a pressure increase within said intake passageway; a pressure control chamber within said housing communicating with said discharge passageway and having rigid walls therearound; a collapsible hollow body of resilient walled construction within said pressure control chamber and changing its displacement in response to the thermal expansion and contraction of the brake fluid whereby to maintain a substantially constant pressure in said discharge passageway when said valve is closed; electrical switching means mounted on the outside of said housing and opened by the movement of a plunger extending therefrom; a rotatable operating shaft extending into said housing; cam means on the inner portion of said shaft operable to lift and hold said valve open; and cam means mounted on the outer end of said shaft and operable to move said plunger to open said switch when said valve is closed.

3. In an auxiliary braking device the combination which includes: a housing adapted to be connected into the main line of a vehicle fluid braking system, and having intake and discharge passageways therein connected to an operating chamber and a valve chamber, respectively, said operating chamber communicating with the intake end of said valve chamber to interconnect said passageways; a spring-urged valve having a head thereon normally seated within said valve chamber, and a follower extending into said operating chamber, said valve head being unseated by a pressure increase within said operating chamber; a pressure control chamber within said housing communicating with said discharge passageway and of rigid walled construction; a resilient hollow body confined in said chamber, collapsible to change its displacement in response to thermal expansion and contraction of the brake fluid whereby to maintain a substantially constant pressure in said discharge passageway when said valve is closed; electrical switching means mounted on the outside of said housing and opened by the movement of a plunger extending therefrom; a rotatable operating shaft extending into said housing; cam means on the inner portion of said shaft operable to lift and hold said valve open; and cam means mounted on the outer end of said shaft and operable to move said plunger to open said switch when said valve is closed.

4. In an auxiliary braking device, the combination which includes: a housing adapted to be connected into the main line of a vehicle fluid braking system, and having intake and discharge passageways therein connected to an operating chamber and a valve chamber respectively, said operating chamber communicating with the intake end of said valve chamber to interconnect said passageways; a spring-urged valve having a head thereon normally seated within said valve chamber, and a follower extending into said operating chamber, said valve head being unseated by a pressure increase within said operating chamber; a pressure control chamber within said housing communicating with said discharge passageway and of rigid walled construction; a resilient hollow body confined in said chamber, collapsible to change its displacement in response to thermal expansion and contraction of the brake fluid whereby to maintain a substantially constant pressure in said discharge passageway when said valve is closed; electrical switching means mounted on the outside of said housing and opened by the compression of a plunger extending therefrom; a rotatable operating shaft extending into said operating chamber from the outside of said housing and having sealing means thereon to hold said fluid within said chamber; cam means on the inner portion of said shaft to lift said follower and hold said valve head open whereby there is a substantially unrestricted path between said intake and discharge passageways; and cam means mounted on the outer end of said shaft and operable to release said switching plunger when said valve head is opened by said inner cam.

References Cited in the file of this patent

UNITED STATES PATENTS

| Number | Name | Date |
|---|---|---|
| 1,758,419 | Wheaton | May 13, 1930 |
| 1,946,759 | Preston et al. | Feb. 13, 1934 |
| 1,951,882 | Pentecost | Mar. 20, 1934 |
| 2,098,736 | Bannon et al. | Nov. 9, 1937 |
| 2,134,902 | White | Nov. 1, 1938 |
| 2,208,220 | Malley | July 16, 1940 |
| 2,250,220 | Cloutier | July 22, 1941 |
| 2,254,523 | Graves | Sept. 2, 1941 |
| 2,301,037 | Greene | Nov. 3, 1942 |

FOREIGN PATENTS

| Number | Country | Date |
|---|---|---|
| 17,403 | Great Britain | Aug. 6, 1896 |
| 214,127 | Switzerland | July 1, 1941 |